Nov. 3, 1964  O. J. BRATZ  3,154,966
BALL BEARING PUSH-PULL CABLE
Filed Jan. 26, 1960  2 Sheets-Sheet 1

INVENTOR
OTTO J. BRATZ
BY
Pennie, Edmonds, Morton, Barrows & Taylor
ATTORNEYS

INVENTOR
OTTO J. BRATZ
ATTORNEYS

United States Patent Office 3,154,966
Patented Nov. 3, 1964

3,154,966
BALL BEARING PUSH-PULL CABLE
Otto J. Bratz, Adrian, Mich., assignor to American Chain
& Cable Company, Inc., a corporation of New York
Filed Jan. 26, 1960, Ser. No. 4,715
8 Claims. (Cl. 74—501)

This invention relates to ball bearing push-pull cables. More particularly, it relates to a push-pull cable assembly which includes novel means for radially locating ball cage strips in proper operating position within the cable, and improved detachable terminal fittings on the ends of the cable.

In one type of ball bearing push-pull cable, a tubular casing houses a central slidable core strip, a pair of race strips spaced on each side of the core strip, and two sets of ball bearings adapted to roll between the core strip and the respective race strips. Between the respective core and race strips a pair of cage strips are located. These cage strips are formed with a multiplicity of longitudinally spaced holes for receiving the bearing balls and keeping them properly spaced longitudinally of the cable.

The present invention provides novel cage strips which are designed to offer as little resistance as possible to the free rolling of the balls and, at the same time, to maintain the balls at uniformly spaced intervals throughout the length of the cable. The new cage strips include novel positioning means by which they are located substantially midway between the core strip and adjacent race strip, so that the balls cannot ride out of their holes during the operation of the cable even when the cable is bent on a very small radius of curvature.

The invention also provides detachable terminal fittings on the ends of the cable which permit the cable to be assembled or dismantled in the field. This allows for easy access to the interior elements of the cable for maintenance or, if the need arises, for the replacement of worn or defective parts. Also, the assembly of a push-pull cable equipped with the new detachable terminal fittings is considerably simplified because substantially all of its various parts are designed to be easily put together in the field.

The new push-pull cable assembly comprises a flexible tubular casing and a flexible core strip extending through the casing and axially movable therein. A pair of flexible ball race strips extend through the tubular casing on opposite sides of the core strip in spaced substantially parallel face-to-face relation therewith. A pair of flexible ball cage strips also extend through the tubular casing between the respective race strips and core strip. Formed integrally with and spaced longitudinally along each cage strip are a multiplicity of rounded protuberances which extend from opposite faces thereof alternately toward the core strip and adjacent race strip. These protuberances serve to space the respective cage strips substantially midway between the core strip and the corresponding race strips.

Both faces of the core strip and the face of each race strip directed toward the core strip have a longitudinal groove formed therein; and each cage strip is formed with a multiplicity of holes located substantially centrally in the space between adjacent protuberances. Bearing balls are disposed in the respective holes in each cage strip in rolling engagement with the core strip and the race strip on opposite sides thereof.

The new cable assembly also advantageously comprises a ferrule surrounding at least one end of the tubular casing. An elongated terminal collar is screw threaded to the ferrule. The race strips terminate substantially within the collar, and are formed with slots in their terminal end portions. Within the collar are securely seated a pair of removable stop elements which are held longitudinally against the ferrule. Tongue members on the stop elements extend therefrom into respective slots in the adjacent race element, whereby axial movement of the races relative to the casing is restrained. The slot in one of the races advantageously is somewhat longer than the tongue received in it, so that the assembly may be bent to a predetermined extent without straining the races or their terminal fastenings.

Preferably, external threads are formed on the end edge portion of the core strip which extend into the collar. Thereby the core strip may be screw threaded to a plunger which fits within the collar and is axially slidable therein. The plunger may be provided with any desired form of end configuration for attachment to the apparatus which the push-pull cable assembly is intended to actuate.

A further important feature of the new push-pull cable is that it includes a special inner flexible metal liner extending substantially throughout its length within the usual outer weatherproof sheath. The metal liner of the new cable is a strip-wound interlocked hose, preferably of heat-resistant stainless steel. Thus, under extreme tension, the convolutions of the liner are adapted to carry the load rather than the race strips within the cable. This has been impossible heretofore in push-pull cables which employ simple helically wound strip liners of the ordinary type. In cables having the conventional liners, the race strips were often forced out of line when put under tension (and such would occur when the core element of the cable was transmitting a considerable compressive force) with a resulting increase in the friction exerted on the core strip, particularly when the race strips were under tension while in a curved position. By the use of the interlocking liner of the invention, this disadvantage is entirely eliminated.

A preferred embodiment of the new ball bearing push-pull cable assembly is described hereinbelow with reference to the accompanying drawings, wherein—

FIG. 2 is a section taken along the line 2—2 of FIG. 1a;

FIG. 3 is a section taken along the line 3—3 of FIG. 1a;

FIG. 4 is a section taken along the line 4—4 of FIG. 1a;

FIG. 5 is a section taken along the line 5—5 of FIG. 1a;

Figure 1A:
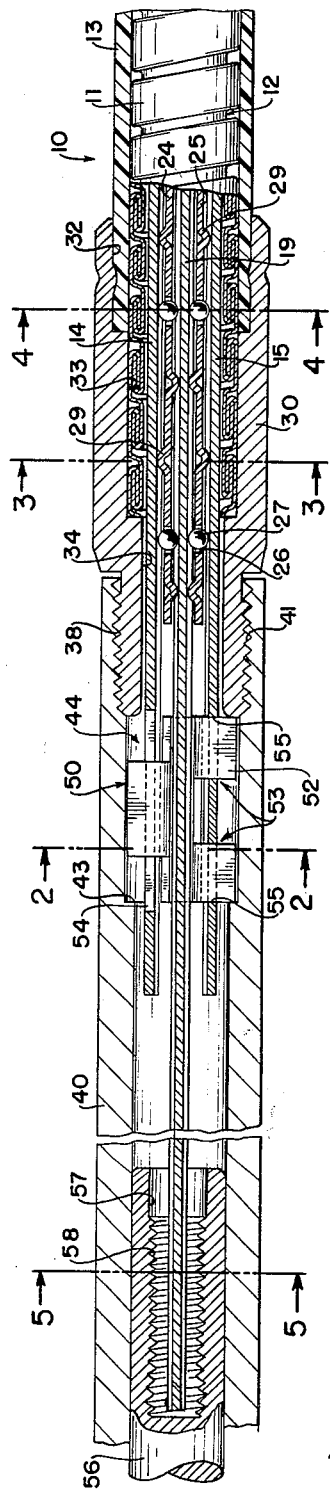
FIGS. 1a and 1b are a fragmentary elevation partly in section and broken away showing opposite end portions of the new cable assembly.
Figure 1B:
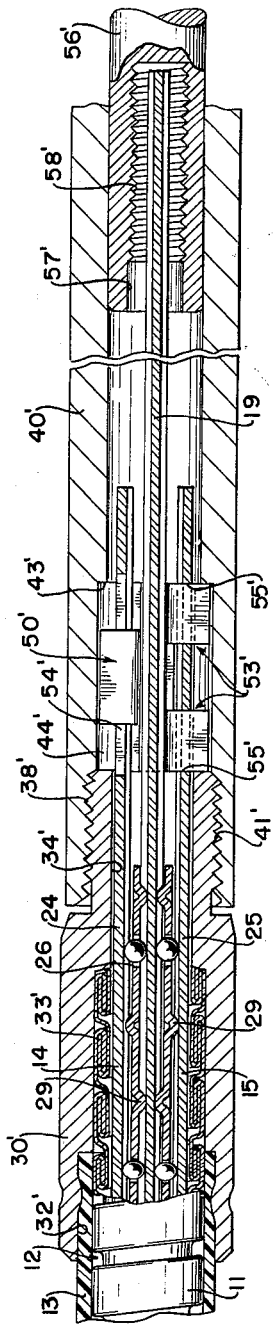

In the cable assembly shown, a tubular casing 10 includes a flexible metal liner 11 which is made up of a helically wound metal strip, the adjacent convolutions of which loosely interlock with one another. Such interlocking is made possible by bending the edges of the strip back upon themselves at substantially 180° as seen in FIGS. 1a and 1b and interlocking the bent edges in adjoining convolutions. This is done in such a manner, however, that interstices 12 are left between the convolutions so that the liner is permitted limited longitudinal extension and compression. Advantageously, the metal strip from which the liner 11 is formed is a heat-resistant stainless steel alloy.

The casing 10 also includes an outer flexible sheath 13 of suitable moisture-resistant polymeric material which is extruded closely over the outside surface of the metal liner 11. When the sheath 13 is fitted about the liner 11 in this fashion, the successive interlocking convolutions of the liner 11 are held partly open so that the interstices 12 are substantially at their mean position, i.e., half-way between metal-to-metal contact and full open position. Hence, when the new push-pull cable is bent into a curve during operation, its neutral axis is not displaced because the interlocking turns of the liner 11 can close to a certain extent on the inside of the curve and open further on the outside of the curve.

The principle advantage of this new metal liner 11 is that when the push-pull cable transmits a great force in compression, a corresponding reaction force puts the metal liner 11 under tension. When this happens, the interlocking turns of the convolutions of the new liner are pulled apart to the point where the interstices 12 are fully opened and then the liner 11 itself bears the tensile load. At no time can extreme loads in tension be transmitted to the inner elements of the new cable and thus no forces are created therein which can in any way adversely effect the substantially frictionless action therewithin.

Extending throughout the length of the casing 10 are a pair of flexible metal race strips 14 and 15 which are spaced opposite each other against the inside surface of the cable. The race strips are formed on one face with longitudinal grooves 16 and 17 respectively extending throughout their length. These grooves are of arcuate cross section and face inwardly on opposite sides of the centerline of the cable. An extended single flexible core strip 19 also extends through the cable between the race strips 14 and 15 in substantially parallel face-to-face relation therewith. The faces of the core strip 19 have grooves 21 and 22 formed therein which are opposed respectively to the grooves 16 and 17 in the race strips 14 and 15. The grooves 21 and 22 are also of arcuate cross section bu of a smaller radius than the grooves 16 and 17.

Figure 4:
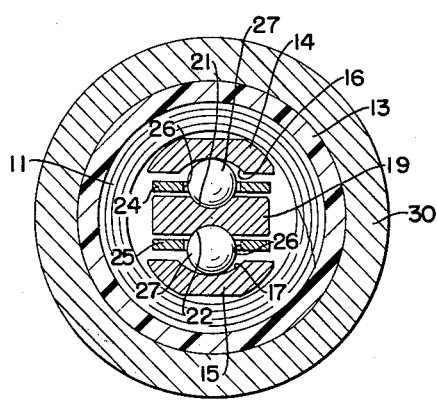

A pair of flexible cage strips 24 and 25 extend through the tubular casing 10 in parallel face-to-face relation between the respective race strips and core strip. Each of the cage strips 24 and 25 has a multiplicity of round holes 26 formed therein at uniform intervals throughout its length. Loosely mounted in the respective holes 26 are a multiplicity of ball bearings 27 having a diameter substantially equal to the spacing between the bases of the opposed grooves 16 and 21 and 17 and 22 respectively, as shown in FIG. 4. The ball bearings 27 are therefore in rolling engagement with the respective opposed grooves. Each of the holes 26 has a diameter slightly greater than that of its corresponding ball bearing 27 and, as a result, the ball bearings are able to roll freely in the cage strips.

According to the invention, a multiplicity of rounded protuberances 29 are formed integrally along each of the cage strips 24 and 25. These protuberances are grouped in equally longitudinally spaced pairs, one pair of protuberances being located between each pair of adjacent ball bearings. In each pair of protuberances, one extends inwardly toward the core strip 19 and the other extends outwardly toward the adjacent race strips 14 or 15. The protuberances 29 and holes 26 may be easily made by continuously forming them into the cage strip as the strip is rolled to shape.

Figure 3:
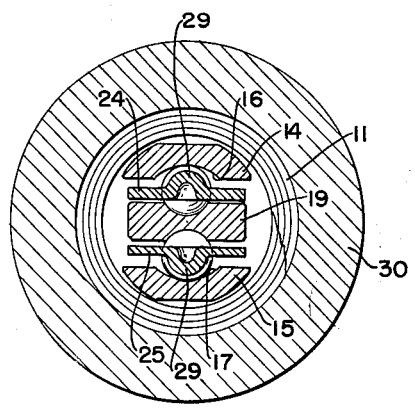

As shown in FIGS. 1a, 1b and 3, the dimensions of the protuberances 29 are such that they loosely space the respective cage strips 24 and 25 substantially midway between the core strip 19 and the corresponding race strips 14 and 15. The equal longitudinal spacing of the protuberances 29 between the ball bearings 27 insures that those sections of the cage strip between the ball bearings are prevented from flexing into contact with the core or race strips when the cable is bent during use. Also, the rounded shape of the protuberances 29 minimizes friction on the core and race strips; there are no edges on the cage strips which are in sliding engagement with any other part. Moreover, the protuberances tend always to remain centered laterally in the respective grooves because they engage the base of the grooves. A further advantage of the protuberances 29 is that they locate the peripheries of the respective holes 26 substantially at the equators of the corresponding ball bearings 27 so that the bearings do not tend to ride over or under the cage strips during the operation of the cable assembly.

The new cable assembly is also provided with detachable terminal fittings at opposite ends of the tubular casing 10.

As shown in the drawing, both terminal fittings are identical. Therefore, for purposes of description the terminal fitting shown in FIG. 1a shall be discussed in detail and the other fitting, which is shown in FIG. 1b, shall be described only briefly with its parts designated by corresponding primed numbers.

Before the terminal fittings are assembled, the sheath 13 is cut away from the end of the tubular casing 10 to bare end portions of the helically wound metal liner 11 at each end of the cable. In FIG. 1a, the terminal fitting shown includes a ferrule 30 formed with inside surfaces 32, 33 and 34. The axial length of the surface 33 is substantially equal to the length of the adjacent bared end portion of the metal liner 11. That portion of the ferrule 30 defining the surfaces 32 is swaged or crimped about the end of the sheath 13 and liner 11 with a mandrel supporting the inside of the liner 11. In this manner the ferrule is securely attached to the end of the casing 10. The outer end of the ferrule 30 is threaded at 38.

An elongated terminal collar 40, internally threaded at one end portion 41, is axially threaded onto ferrule threads 38. The inside diameter of the collar 40 is also substantially equal to the outside diameter of the metal liner 11. The core strip 19 extends completely through the ferrule 30 and well into the collar 40. Also, the race strips 14 and 15 extend through the ferrule 30 into the collar 40 but not as far as the core strip 19. The cage strips 24 and 25 extend beyond the end of the helically wound metal liner 11 into the passage in the ferrule formed by the surface 34 but they do not extend through into the collar 40.

Figure 2:
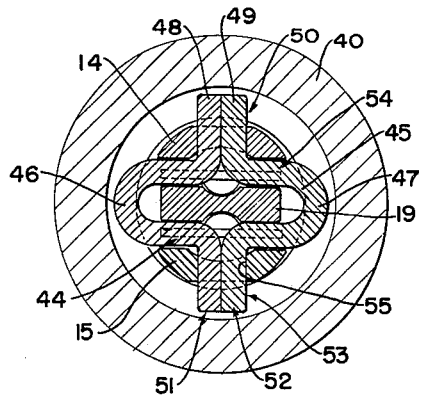

Formed within the collar 40 and spaced from the adjacent outer end of the ferrule 30 is an inner circumferential shoulder 43. As shown in FIGS. 1a and 2, a pair of separate stop elements 44 and 45 are fitted together between the race strips 14 and 15 and are held longitudinally between the shoulder 43 and the adjacent end of the ferrule 30. The stop elements 44 and 45 include U-shaped central portions 46 and 47 respectively which in the assembly are cojoined with their open ends in opposition. From the adjoining edges of the central portions 46 and 47 on one side thereof extends abutting tabs 48 and 49 respectively which together comprise a single longitudinally arranged tongue member 50. At the opposite adjoining edges of the central portions 46 and 47, double tabs 51 and 52 extend respectively and together comprise double longitudinally arranged tongue members 53.

Consequently, the respective stop elements 44 and 45 are brought together in the assembly in face-to-face engagement and are fitted about the core element 19 between the core element and the race strips 14 and 15. In the adjacent end portion of the race strip 14, an elongated longitudinal slot 54 is formed into which the single tongue member 50 extends. The slot 54 permits a considerable amount of longitudinal movement of the race strip 14 relative to the terminal fittings of the cable. In the adjacent end portion of the race strip 15 two relatively short double slots 55 are formed which receive the double tongue members 53. The double slots closely confine the respective double tongue members 53 so that the race strip 15 is held fast longitudinally relative to the terminal fitting.

In the terminal fitting at the opposite end of the cable assembly (see FIG. 1b), which is similar to that described in reference to FIG. 1a, a ferrule 30′ formed with inside surfaces 32′, 33′ and 34′ is swaged onto the end of the casing in the manner described previously. Also, the outer end of the ferrule 30′ is threaded at 38′ to receive the internally threaded end of an elongated collar 40′. An internal shoulder 43′ in this collar provides a seat for a pair of stop elements, only one of which (44′) is visible. A single tongue member 50′ (formed from two tabs similar to the tabs 48 and 49) and double tongue members 53′ (formed from two tabs similar to the tabs 51 and 52) extend inwardly from opposite sides of the stop elements 44' and 45'. A single slot 54' in the race strip 14 receives the single tongue member 50' and double slots 55' in the race strip 15 receive the respective double tongue members 53'.

By this construction, the minimum radius of curvature to which the cable may be bent during operation is considerably reduced when the race strip 14 is on the outside of the bend, because the race strip 14 is not put under tension unless the tongue members 50 and 50' at the opposite ends of the cable slide to the innermost ends of their respective elongated slots 54 and 54'. Thus, the cable assembly may be bent into a very tight curve when the race strip 14 is on the outside of the curve. When the other race strip 15 is on the outside of the curve, the confined double-tongue members 53 and 53' immediately put the race strip 15 under tension and thereby prevent substantial bending in that direction.

When the cable assembly is installed, one or both of the elongated collars 40 and 40' at the ends of the cable are usually held stationary. Extending from the outer end of the collars 40 and 40' are longitudinally slidable plungers 56 and 56' respectively which normally engage linkages or the like through which a force is to be transmitted. A push or a pull on the plunger 56 on one end of the cable assembly transfers a corresponding push or pull through the slidable core strip 19 to the other plunger 56' at the opposite end of the cable.

Figure 5:
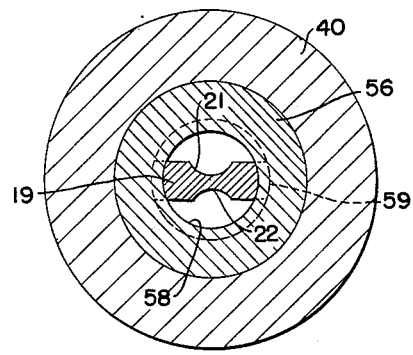

Each of the plungers 56 and 56' is secured to its associated end of the core strip 19 by novel connecting means which permit the plunger to be easily detached from the assembly in the field without taking apart the associated terminal fitting. The connecting means include axial bores 57 and 57' respectively extending into the plungers 56 and 56' from the ends thereof adjacent the core element 19. Internal threads 58 and 58' are formed in the inner portion of the bores 57 and 57'. The opposite end portions of the core strip 19 are formed on their edges (see FIG. 5) with corresponding helical threads 59. Thus, the plungers may be threaded onto the end of the core strip 19 simply by directing them into their respective collars and turning them down onto the core strip. This feature further enables the new push-pull cable to be completely dismantled and assembled in the field.

Figure 7:
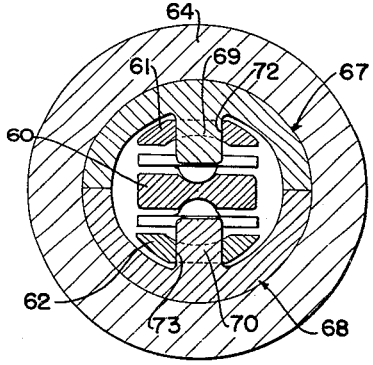
FIG. 7 is a section taken along the line 7—7 of FIG. 6.
Figure 6:
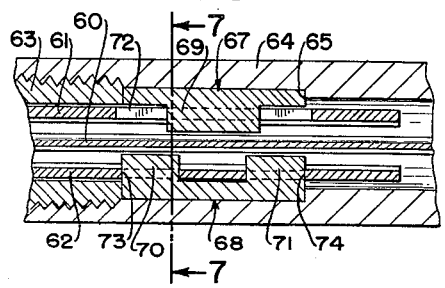
FIG. 6 is a fragmentary elevation of another embodiment of the stop element to be used in the terminal fittings of the new cable.

Referring now to FIGS. 6 and 7, a portion of a terminal fitting is shown which is the same as that described with reference to FIG. 1b except that the stop elements are of a modified design. Thus, a portion of a core strip 60 and of a pair of race strips 61 and 62 are visible extending from the threaded end of a ferrule 63. Threaded to the ferrule 63 is the elongated collar 64 in which a circumferential shoulder 65 is formed. A pair of separate half-cylinder stop elements 67 and 68, which have an outside diameter equal to the inside diameter of the collar between the shoulder 65 and the adjacent threaded end of the ferrule 63, are securely seated edge-to-edge on opposite sides of the inside surface of each collar. They are held longitudinally between the shoulder 65 and the ferrule 63 when the collar is threaded onto the ferrule.

The stop element 67 has an integral longitudinally arranged single tongue member 69 extending radially inwardly from its inside surface and the other stop element 68 has double longitudinally arranged tongue members 70 and 71 extending radially inwardly from its inside surface. In the adjacent end portion of the race strip 61, an elongated longitudinal slot 72 is formed into which the single tongue member 69 on the stop element 67 extends. The slot 72 permits a considerable amount of longitudinal movement of the race strip 61 relative to the terminal fitting. In the adjacent end portion of the race strip 62, two relatively double slots 73 and 74 are formed which receive the double tongue members 70 and 71 on the stop element 68. The double slots 73 and 74 closely confine the tongue members 70 and 71 so that the race strip 62 is held fast longitudinally relative to the terminal fitting.

Thus, it is evident that the stop elements shown in FIGS. 6 and 7 differ from those previously described in that they are fitted about, rather than between, the end portions of the associated race strips. Also their tongue members are unitary and extend radially inwardly. In operation, the stop elements of FIGS. 6 and 7 perform the same as in the previous embodiment. When the cable is bent with the race strip 61 on the outside of the curve, the tongue member 69 of the stop element 67 can slide within its slot 72. When the race strip 62 is on the outside of the curve, however, the tongue members 70 and 71 in the other stop element 68 are confined within their slots 73 and 74 and substantial bending of the cable is prevented.

I claim:

1. A push-pull cable assembly comprising a flexible tubular casing, a flexible core strip extending through said tubular casing and axially movable therein, a pair of flexible ball race strips extending through said tubular casing on opposite sides of said core strip in spaced substantially parallel face-to-face relation therewith, a pair of flexible ball cage strips extending through said tubular casing between the respective race strips and the core strip, retaining means at each end of the cable assembly holding said race and cage strips within said casing, a multiplicity of rounded protuberances formed integrally in and spaced longitudinally along each of said cage strips and extending from opposite faces thereof alternately toward said core strip and the adjacent race strip, said protuberances serving to space the respective cage strips substantially midway between the core strip and the corresponding race strips, each of said cage strips having a multiplicity of holes formed therein, each of said holes being disposed substantially centrally in the space between each adjacent pair of protuberances, and bearing balls disposed in the respective holes in each cage strip in rolling engagement with the core strip and the race strip on opposite side thereof.

2. A push-pull cable assembly comprising a flexible tubular casing, a flexible core strip extending through said tubular casing and axially movable therein, a pair of flexible ball race strips extending through said tubular casing on opposite sides of said core strip in spaced substantially parallel face-to-face relation therewith, a pair of flexible ball cage strips extending through said tubular casing between the respective race strips and the core strips, retaining means at each end of the cable assembly holding said race and cage strips within said casing, a multiplicity of rounded protuberances formed integrally in an spaced longitudinally along each of said cage strips and serving to space the respective cage strips substantially midway between the core strip and the corresponding race strips, said protuberances being grouped in pairs with one protuberance of each pair extending toward said core strip and the other extending toward the adjacent race strip, the space separating the protuberances of each pair being relatively short and the space separating each pair of protuberances being relatively long, each of said cage strips having a multiplicity of holes formed therein substantially centrally in the relatively long spaces between adjacent pairs of protuberances, and bearing balls disposed in the respective holes in each cage strip in rolling engagement with the core strip and the race strip on opposite side thereof.

3. A push-pull cable assembly comprising a flexible tubular casing, a flexible core strip extending through said tubular casing and axially movable therein, a pair of flexible ball race strips extending through said tubular casing on opposite sides of said core strip in spaced substantially parallel face-to-face relation therewith, a pair of flexible ball cage strips extending through said tubular casing between the respective race strips and the core strip, a multiplicity of rounded protuberances formed integrally in and spaced longitudinally along each of said cage strips and extending from opposite faces thereof alternately toward said core strip and the adjacent race strip, said protuberances serving to space the respective cage strips substantially midway between the core strip and the corresponding race strips, each of said cage strips having a multiplicity of holes formed therein, each of said holes being disposed substantially centrally in the space between an adjacent pair of protuberances, bearing balls disposed in the respective holes in each cage strip in rolling engagement with the core strip and the race strip on opposite sides thereof, a ferrule surrounding at least one end of said tubular casing, an elongated terminal collar screw threaded to said ferrule, said race strips terminating within said collar and having slots formed in the end portions thereof, removable stop elements held longitudinally against said ferrule, a tongue member on said stop elements extending radially into the respective slots in the adjacent race element, whereby axial movement of the races relative to the casing is restrained, one end portion of said core strip extending into said collar and being formed on its edges with external threads, a plunger longitudinally freely movable within said collar and formed with an axial bore in the end thereof adjacent said end portion of said core strip, said plunger having internal threads formed within said bore and being in threaded engagement with the threaded end portion of said core strip.

4. A push-pull cable assembly comprising a flexible tubular casing, a flexible core strip extending through said tubular casing and axially movable therein, a pair of flexible ball race strips extending through said tubular casing on opposite sides of said core strip in spaced substantially parallel face-to-face relation therewith, a pair of flexible ball cage strips extending through said tubular casing between the respective race strips and the core strip, a multiplicity of rounded protuberances formed integrally in and spaced longitudinally along each of said cage strips and serving to space the respective cage strips substantially midway between the core strip and the corresponding race strips, said protuberances being grouped in pairs with one protuberance of each pair extending toward said core strip and the other extending toward the adjacent race strip, the space separating the protuberances of each pair being relatively short and the space separating each pair of protuberances being relatively long, each of said cage strips having a multiplicity of holes formed therein substantially centrally in the relatively long spaces between adjacent pairs of protuberances, bearing balls disposed in the respective holes in each cage strip in rolling engagement with the core strip and the race strip on opposite sides thereof, a ferrule surrounding each end of said tubular casing, an elongated terminal collar screw threaded to each ferrule, said race strips terminating within the respective collars, a pair of removable stop elements in each collar held longitudinally against said ferrule, one of said race strips having an elongated longitudinal slot formed in each end portion thereof within the respective collars, first tongue means formed in said stop elements adjacent the respective elongated slot within each collar and extending radially thereinto and being longitudinally movable therein, the other of said race strips having a shorter longitudinal slot formed in each end portion thereof within the respective collars, second tongue means formed in said stop elements adjacent the respective shorter slot within each collar and extending radially thereinto and being longitudinally confined therein, the end portions of said core strip extending beyond the adjacent ends of said race strips and being formed on their edges with external threads, a plunger longitudinally freely movable within each collar and formed with an axial bore in the end thereof nearest the adjacent end of said core strip, each plunger having internal threads formed within said bore in threaded engagement with the adjacent threaded end portion of said core strip.

5. In a push-pull cable assembly according to claim 4, said stop elements fitting partially between said core strip and the respective race strips and the tongue means thereof extending outwardly into the respective slots.

6. In a push-pull cable assembly according to claim 4, said stop elements fitting partially about said race and core strips against the inside surface of said collar and the tongue means thereof extending inwardly into the respective slots.

7. A push-pull cable assembly comprising a flexible tubular casing, said casing comprising an outer flexible sheath and an inner flexible helically wound metal liner, the successive adjoining turns of said liner being loosely interlocked to permit only limited extension and compression of said liner and being normally in half-opened relation to one another, a flexible core strip extending through said tubular casing and axially movable therein, a pair of flexible ball race strips extending through said tubular casing on opposite side of said core strip in spaced substantially parallel face-to-face relation therewith, a pair of flexible ball cage strips extending through said tubular casing between the respective race strips and the core strip, a multiplicity of rounded protuberances formed integrally in and spaced longitudinally along each of said cage strips and extending from opposite faces thereof alternately toward said core strip and the adjacent race strip, said protuberances serving to space the respective cage strips substantially midway between the core strip and the corresponding race strips, each of said cage strips having a multiplicity of holes formed therein, each of said holes being disposed substantially centrally in the space between an adjacent pair of protuberances, bearing balls disposed in the respective holes in each cage strip in rolling engagement with the core strip and the race strip on opposite sides thereof, a ferrule surrounding at least one end of said tubular casing, an elongated terminal collar screw threaded to said ferrule, said race strips terminating within said collar and having slots formed in the end portions thereof, removable stop elements in said collar held longitudinally against said ferrule, a tongue member on said stop elements extending radially into the respective slots in the adjacent race element, whereby axial movement of the races relative to the casing is restrained, one end portion of said core strip extending into said collar and being formed on its edges with external threads, a plunger longitudinally freely movable within said collar and formed with an axial bore in the end thereof adjacent said end portion of said core strip, said plunger having internal threads formed within said bore and being in threaded engagement with the threaded end portion of said core strip.

8. In a push-pull cable assembly which includes a tubular casing, a core element axially movable within the casing, a pair of race strips extending through the casing in opposed face-to-face relation on opposite sides of the core element, a plurality of bearing means on opposite sides of the core element in rolling engagement with the core element and the respective race strips, a pair of cage strips extending through the casing between the respective race strips and the core element and formed with axially spaced holes in which the respective bearing means are loosely positioned, and retaining means at each end of the cable assembly for holding the race and cage strips within the casing; improved means for radially locating the cage strips in the cable assembly comprising protuberances on each of said cage strips extending from opposite faces thereof toward the core element and the adjacent race strip and being spaced between the holes in the cage strip, said protuberances spacing their associated cage strip substantially midway between the core element and the adjacent race strip.

(References on following page)

References Cited in the file of this patent

UNITED STATES PATENTS

| | | |
|---|---|---|
| 2,083,937 | Begg | June 15, 1937 |
| 2,373,776 | Parr | Apr. 17, 1945 |
| 2,457,910 | McLaren et al. | June 4, 1949 |
| 2,730,134 | Morse | Jan. 10, 1956 |
| 2,841,029 | Richoux | July 1, 1958 |
| 2,845,813 | Richoux | Aug. 5, 1958 |
| 3,013,443 | Morse | Dec. 19, 1961 |

FOREIGN PATENTS

| | | |
|---|---|---|
| 44,170 | France (2nd addition to 755,967) | Aug. 20, 1934 |
| 431,515 | Great Britain | July 10, 1935 |
| 850,578 | France | Sept. 18, 1939 |